Jan. 31, 1939. T. B. CHACE 2,145,248
METHOD OF PRODUCING STEEL CLAD WITH A COPPER
BASE METAL AND THE PRODUCT THEREOF
Filed Feb. 14, 1935 4 Sheets-Sheet 3
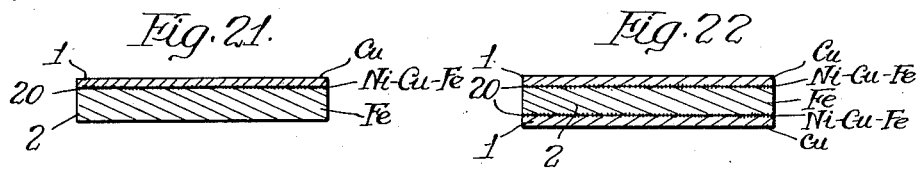
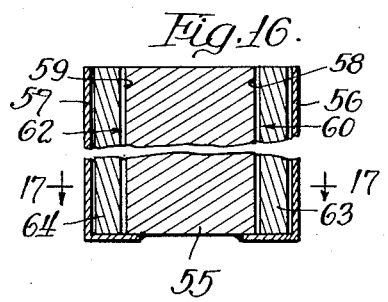
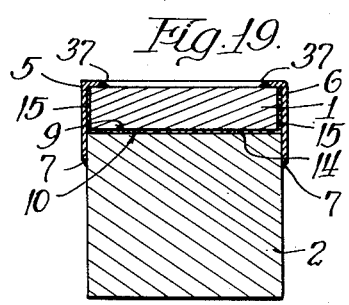
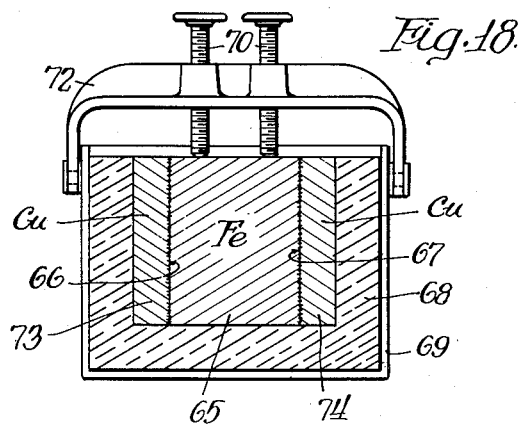
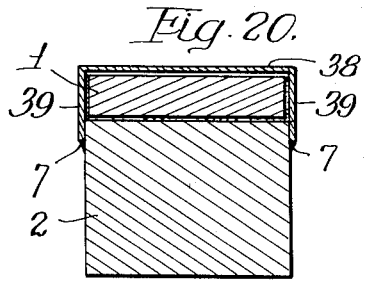
Inventor:
Thomas B. Chace
By Brown Jackson Boettcher Dienner
Attys.

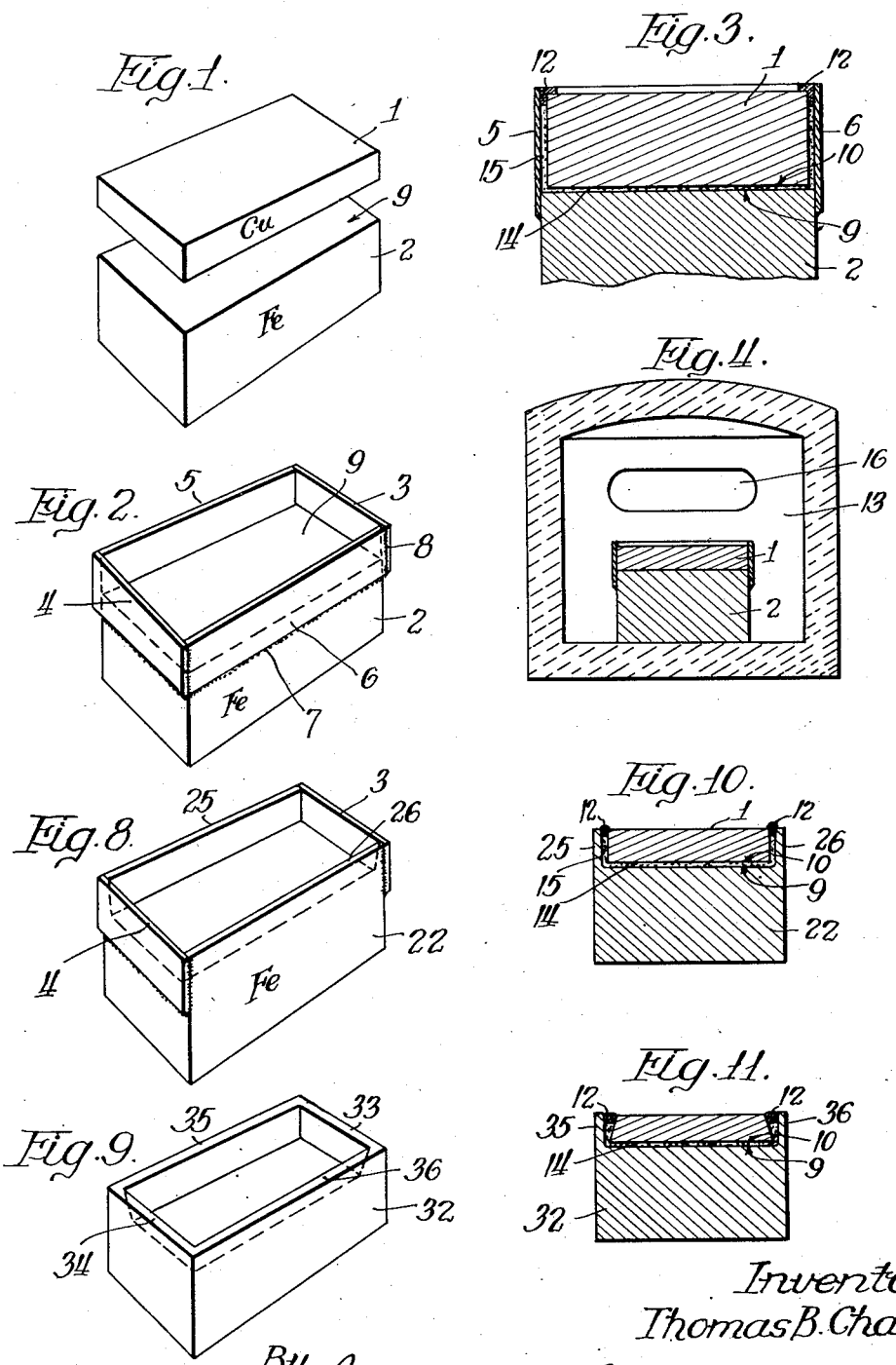

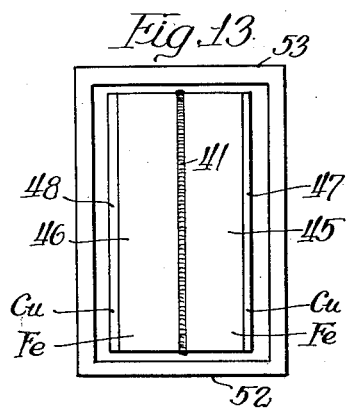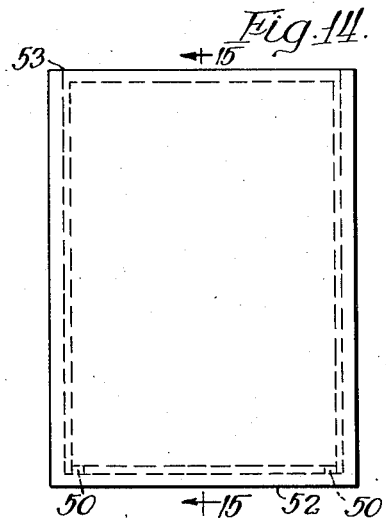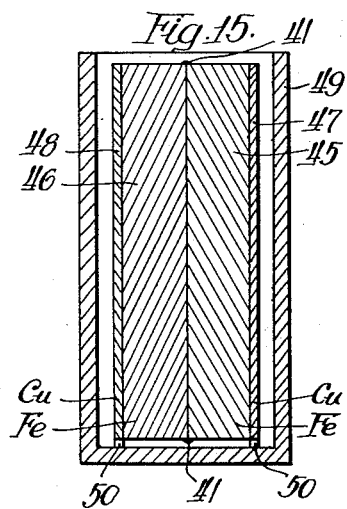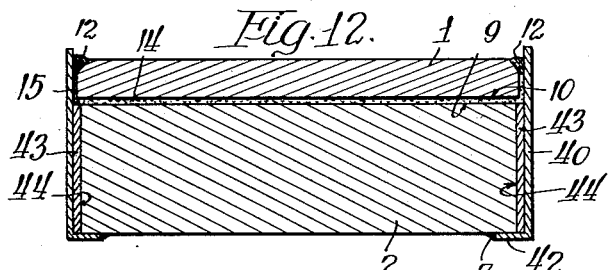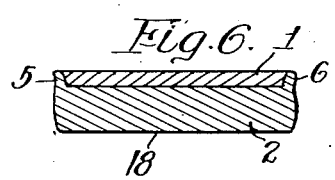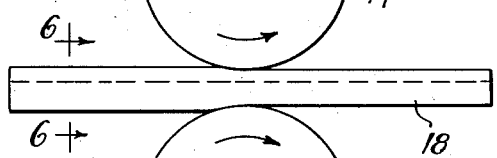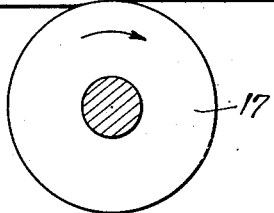

Jan. 31, 1939. T. B. CHACE 2,145,248
METHOD OF PRODUCING STEEL CLAD WITH A COPPER
BASE METAL AND THE PRODUCT THEREOF
Filed Feb. 14, 1935  4 Sheets-Sheet 4
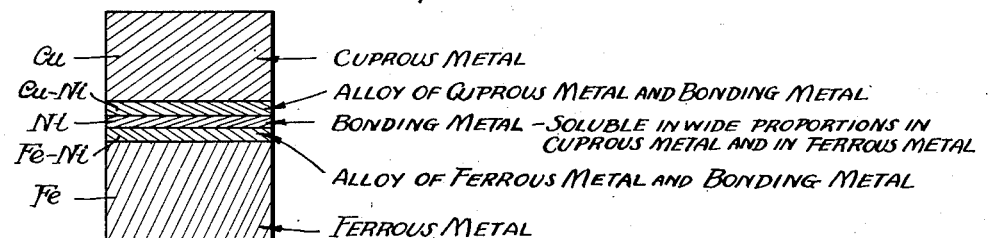
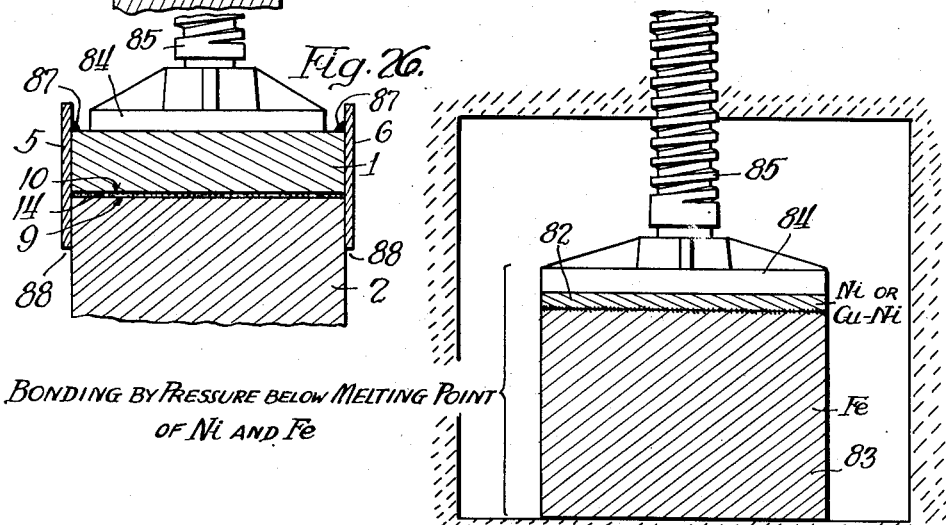
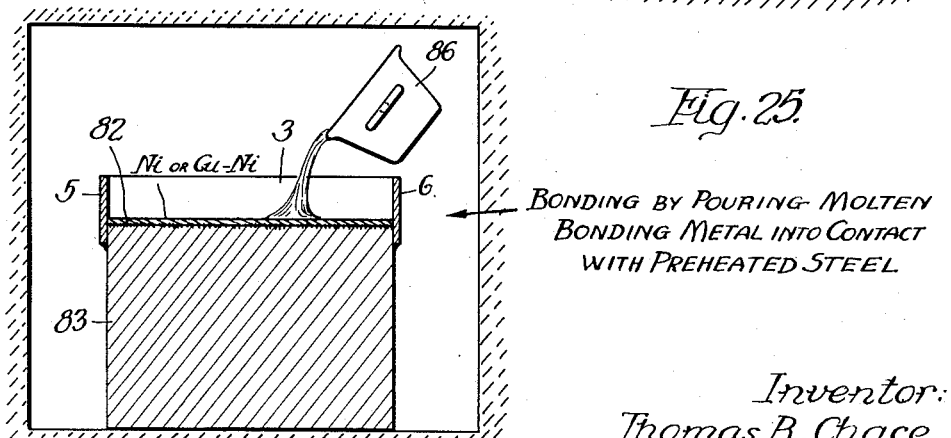
Inventor:
Thomas B. Chace.

Patented Jan. 31, 1939

2,145,248

UNITED STATES PATENT OFFICE 2,145,248

METHOD OF PRODUCING STEEL CLAD WITH A COPPER BASE METAL AND THE PRODUCT THEREOF

Thomas B. Chace, Winnetka, Ill., assignor, by direct and mesne assignments, to Clad Metals Industries, Inc., a corporation of Illinois Application February 14, 1935, Serial No. 6,497

47 Claims. (Cl. 29—188)

My invention relates to clad metal and the process of producing the same. The preferred embodiment of my invention concerns the production of a ferrous base metal clad with a cuprous coating metal.

Copper and copper base alloys, which are herein termed cuprous metal, have, as is well known, desirable corrosion resisting qualities. Many applications of cuprous metal where its corrosion resisting or other qualities are desirable are not commercially practicable because of the relatively high cost as compared to other cheaper but less desirable materials.

My invention aims, among other things, to provide a composite metal in sheet, plate, bar, rod or the like form, consisting of a steel base clad with copper or a copper base alloy. The composite or clad metal may consist of a relatively heavy backing of iron or steel, and a relatively light cladding of copper or copper base alloy. For example, in a composite sheet, the iron or steel base or backing may consist of from 90% to 80% of the thickness of the sheet, and of from 10% to 20% of the thickness of the plate of copper or a copper base alloy. Thus, by making the composite metal chiefly of an inexpensive material, such as low carbon steel, and using only a relatively thin layer or cladding of copper or copper base alloy, a wide field of applications is opened up.

It has heretofore been proposed to bond a layer of copper upon a steel or iron base, but so far as I am aware, no one has heretofore succeeded in producing successfully, or under commercial conditions, composite sheet metal or the like for general use.

There is a demand for cuprous clad sheet steel for use, for example, in making up hot water tanks, in making sheet metal pipe, for exposed sheet metal for structural uses and the like. So far as I am aware, composite metal of this general class has been confined in commerce to special uses, such as bimetallic thermostatic metal where no other competitive metal exists. My invention is in certain respects applicable to the production of thermostatic metal as well as clad metal for general utility.

The production of the metal of my invention involves the preparation of a suitable ingot or slab which may then be rolled into suitable sheet or strip form, or, in case of rods or bars, rolled or drawn into suitable form. The ingot is faced on one side or on both sides for the production of sheets and surrounded on its lateral faces for bars or rods.

There are many difficult problems in the production of clad metal for general use, and the first and perhaps one of the most difficult ones, is the bonding together cheaply and effectively of cuprous and ferrous metals to produce the bar or ingot.

One of the chief objects of the present invention is to provide a process for joining as by fusion welding unlike metals, such as copper or a copper base alloy and steel into ingot or slab form for rolling into clad sheet or strip form.

It has heretofore been attempted to joint metals of different melting points, such as copper base alloys and steel, to form a composite bimetallic ingot or slab. One method of approach has been to provide a steel mould or box. A slab of steel just fitting into the box is laid in the bottom. The upper surface of the steel slab before it is put into the box is cleaned off and fluxed. Then a copper bar of the same outline as the steel bar is laid on top of the steel bar in the box, and the box subjected to a temperature high enough to melt the copper.

The difficulty of fitting the steel slab into the mould will be apparent. The fit must be liquid tight on the sides, ends and corners. It is well known that copper or copper base alloys in molten form will flow through the smallest opening. Also copper weighs about 550 pounds per cubic foot, whereas steel weighs about 490 pounds per cubic foot. Hence, the copper or copper alloy cannot be adequately controlled and tends to run under the steel slab, not only causing loss of copper, thereby spoiling the proportions, but often necessitating expensive machining to remove the copper from the under surface or causing possible loss of the whole slab. In addition, there is the difficulty of removing the composite slab from the mould.

The use of a refractory mold instead of a steel mold fails for similar reasons. It is not possible to fit the steel slab liquid tight into a refractory mold. Refractory is brittle and difficult to handle without breakage. The impracticability of making large refractory molds and fitting large steel slabs definitely limits the size to unusable dimensions for the purpose in mind.

Pliable refractory has been tried, but this material when subjected to furnace temperatures required to melt the copper or copper base metal, dries out, shrinks and cracks providing crevices or pores through which the molten copper may escape or run under the steel. This latter method may be employed with fair success for comparatively small slabs of steel and brass (65% copper, 35% zinc) or Muntz metal (60% copper and 40% zinc) which are not so fluid in molten condition, and do not require as high a welding temperature. However, it fails for comparatively large slabs of steel and brass, and it is particularly not suitable for steel and some of the high copper alloys, such as silicon copper (96% copper, 3% silicon, and 1% manganese). The necessary high welding temperature for such copper alloys further breaks down the refractory material.

The present invention aims to provide a method of welding two dissimilar metals, such as copper or a copper base alloy to steel, in ingot or slab form of comparatively large size, namely, 1,000 to 8,000 pounds or upwards, so as to utilize regular hot slab and hot continuous strip rolling practice such as is known as steel mill practice for processing from ingot form to copper base alloy clad sheet steel. Steel mill practice, in rolling, is characterized by heavy reduction in section whereby the cost of handling and of reheating is minimized. To withstand such severe reduction in section involves the production of a tough, ductile bond at the union of the two metals that will not become brittle itself, or produce brittle layers where a weakness would be developed by severe rolling. A particular embodiment of my invention is a commercially workable process for welding low carbon steel and silicon bronze (one form of which is marketed under the trade name of "Everdur" and consists of substantially 96% Cu, 3% Si and 1% Mn). This alloy melts at about 1866° F. but to weld the same to steel requires a temperature of about 2200° F. at the union. Such a high temperature is not injurious to such high copper alloys as "Everdur" and results in a very strong bond. Instead of employing this particular bronze having a silicon content of about 3%, other copper alloys may be employed in which the silicon content ranges above or below this figure and is either alloyed with copper alone or with additional elements such as manganese, nickel, iron, zinc, tin and phosphorus. As will appear hereinafter, the presence of silicon in the copper facing is of great importance. The amount that is used will depend on the other metal or metals also alloyed with the facing metal, the conditions of working, the metals that are used in the bond and the composition of the backing metal. The silicon content in the cladding metal may range from .1% to 4.5% and, as indicated, it may be alloyed with copper alone or with other metals, such as manganese, nickel, iron, zinc, tin and phosphorus, to form the desired corrosion resisting layer integrally bonded to the steel backing metal. It is to be noted that fluidity is not necessarily related to temperature, but depends mainly on composition or analysis.

According to the preferred embodiment of my invention, the steel ingot, or a suitable part thereof, is itself the mold for receiving the copper bar which is welded thereinto. The mold may be variously constructed, i. e., as by welding steel strips to the sides and ends of the steel slab to form a box or mold, the bottom of which is the slab or ingot to which the copper is to be joined. The side and end walls may be formed integrally, as by casting or forging, or they may be formed partly integral as by rolling the ingot or slab into channel form, cutting off a suitable length, and welding steel strips across the end. The inside of this liquid-tight boxlike structure is cleaned and fluxed, and the copper alloy insert with the welding surface protected from oxidizing is inserted into the box and the whole is then fired or heated to melt the copper or copper alloy in place and cause it to weld to the steel slab or ingot. In lieu of melting the copper alloy in situ it may be separately melted and then poured into the mold, which is meanwhile protected by a flux during the heating of the mold.

In an adaptation of my invention, a round ingot for producing rods or the like is provided with a concentric cylindrical casing closed at the bottom, and having the steel ingot suitably held in place. A hollow cylinder of copper or sections of a copper cylinder may then be inserted and the copper welded to the ingot by fusion. Also the steel ingot with its mold, or apart from the same, may be heated and copper or copper alloy in molten form be poured into the mold.

The flanges or strips which provide the container integral with the steel slab are advantageous in the rolling of the composite slab in restraining the copper facing from excessive spreading edgewise. If too much spreading occurs, the percentage of thickness of the copper may be reduced below the desired value and the copper thus squeezed out at the edge is wasted.

A further object of my invention is concerned with rendering the practice of the process of producing the composite ingot less critical in respect to time and temperature.

In the practice of the invention wherein the copper or copper base alloy is welded directly to low carbon steel or the like the control of temperature and time is relatively delicate. To effect a bond at the union of the two metals, the iron must alloy with the copper. Iron is soluble in copper and vice versa only in very limited percentages. If the copper and steel are maintained at elevated temperatures for a period of time, they mix in greater percentages than are soluble at lower temperatures, and a hard brittle alloy and weakened weld is the result.

One feature of the process is to heat the upper or welding surface of the steel first and to the highest permissible temperature without necessarily subjecting the body of the steel section to as high a temperature. This is accomplished through utilizing the high heat conductivity of the copper and by directing the heat as much as possible to the top surface during welding.

Maintaining the welding surfaces at elevated temperatures over too long a time will cause excessive and permanent grain growth which is not restored to normal grain structure by rolling. This can be detected by photomicrographs of a cross section of the welded ingot which has been subjected to elevated temperatures for an excessive period. This detrimental grain growth is visible for a depth of several thousandths of an inch from the upper or welding surface while the rest of the steel section is not injured. The result of this is a brittle and weakened weld.

According to this development of my invention, I introduce one or more elements which are soluble in wide proportions in both iron and copper. One such element is nickel. Iron and nickel are soluble in all proportions in the molten state, and remain as a solid solution upon solidification. The alloys of copper and nickel form a simple series with complete miscibility in both liquid and solid state.

The present process is adaptable to all steels such as plain, alloy treated and alloy steels in combination with copper or copper base alloy. The greatest commercial possibilities reside in producing a copper base alloy clad steel using the lowest cost plain steel. Higher cost alloy steels may be used, but have the disadvantage of a higher priced product. Low nickel alloy steel of less than five per cent nickel permits some alloying of nickel and copper at the weld and obviously higher percentage of nickel provide greater alloying and consequently better bonding.

As nickel is needed only at the union for alloying the thickness of the weld which is about .002 inch, the percentage of nickel to steel is about .0002 per cent or a negligible cost. The provision of nickel at the weld may be accomplished by any of several methods, such as electroplating nickel or copper and nickel on the welding surface of the steel to proper thickness, depositing the same by chemical precipitation, by providing the nickel in the flux, by inserting a thin sheet of Monel metal or the like.

The resultant weld is accomplished without delicate control of time and temperature and constitutes an alloy of iron and nickel and copper and nickel, or all three, iron, nickel, and copper, and is tough and ductile. The nickel also inhibits the excessive grain growth at the welding surface of the steel.

Where the nickel or like bonding metal is to be added to the welding surface of the steel as a thin coherent layer or sheet, it may be accomplished in any one of several ways. It may be done by bonding the nickel as a thin rolled sheet to the backing of steel, by pressure at a temperature below the melting point of nickel and below that of the steel, to produce a weld.

Another way is to bond the nickel to the steel by pouring molten nickel or like bonding metal into contact with the welding face of the preheated steel block.

A thin layer or sheet of nickel can first be welded to the upper surface of the steel slab before copper is applied. The melting temperatures of nickel (2635° F.) and of steel (2750° F.) are fairly close, so that the welding of the two is a relatively simple matter. Nickel is an ideal binder in the process of cladding copper to steel, as it not only has an affinity for practically all of the elements commonly alloyed in steel, but also for all the elements such as tin and zinc utilized in the copper family for making copper alloys. It therefore makes possible the welding of brasses and bronzes having high zinc or tin content at temperatures low enough not to burn out these elements.

The welded ingot or sheet may thus be made up of, first, a relatively thick low carbon steel backing; second, a thin nickel-steel alloy section; third, a nickel section; fourth, a copper-nickel alloy, and fifth, the copper or brass cladding alloy. The nickel-iron alloy section (second above named) may contain such other elements as chromium, cobalt, manganese, magnesium, molybdenum, phosphorus, silicon and carbon. The copper-nickel alloy section (fourth above named) may contain such other elements as aluminum, lead, manganese, silicon, tin and zinc. Any nickel-steel alloy having high enough nickel content to permit sufficient alloying of nickel with iron and copper could be used in place of pure nickel. The resulting alloy at the union is iron, nickel and copper.

Obviously, instead of pure nickel, Monel metal, or a similar alloy of nickel and a metal soluble in nickel may be employed in the above union as the bonding metal.

The alternative method of joining a thin layer of nickel to the face of the iron is to preheat the steel block previously prepared with the integral mold box, and preferably held in a reducing atmosphere, and to pour into the mold box in contact with the welding face of the steel a sufficient amount of molten nickel or nickel alloy to cover the surface of the welding face of the steel. Since a fairly thick film of nickel is necessary to insure covering the face, the block may be rolled to a thinner section before the copper is applied. However, with Monel metal, which is a natural alloy of copper and nickel, the item of expense is not so serious, and a sufficient amount of molten bonding metal may be employed to insure a satisfactory bond without rolling the resultant block.

Now it is to be observed that my process of joining cuprous and ferrous metals is broadly useful no matter whether the end product is a structural material, i. e., a clad metal, or whether it is a bimetallic metal for thermostatic purposes.

For bimetallic thermostatic metal the desideratum is the junction of two metals of widely different thermal coefficients of expansion. For clad metal the difference in thermal coefficients of expansion is a problem. It makes rolling and subsequent working of the metal difficult, and produces internal stresses which are highly undesirable.

In the production of clad sheet metal according to one embodiment of my invention, I employ as the cuprous cladding metal an alloy of silicon bronze, such as is now on the market under the name of "Everdur" and consists substantially of 96% Cu, 3% Si and 1% Mn, and I employ as the base or backing a body of low carbon steel.

This gives me a highly desirable product. First, the silicon bronze can be heated to a high enough temperature to secure a good bond or weld without injuring its properties. Next, the structural strengths are comparable, and, finally, the thermal coefficients are close together. There are additional advantages, but the above insure, first, that the metals will form a satisfactory bond or weld that will prevent separation under subsequent operations and in use. Second, that the rolling process will not unduly spread out the cuprous metal and result in undue thinning and waste, and, finally, that in rolling, in subsequent working, and in use, the metal will not warp or curl unduly.

Now in order to acquaint those skilled in the art with the manner of constructing and operating a device in accordance with my invention I shall describe, in connection with the accompanying drawings, a specific embodiment of the same.

In the drawings:

Figure 1 is an isometric view of a copper slab superposed over a steel ingot;

Figure 2 shows the manner in which the steel ingot is provided with walls for retaining the copper when in molten condition upon the top surface of the steel ingot;

Figure 3 shows the copper slab or bar placed upon the top of the steel ingot, with flux interposed between the copper and steel and the edges of the steel slab patched to exclude the entry of gases to the welding surfaces;

Figure 4 shows the compound ingot prepared for the welding operation, disposed in a furnace;

Figure 5 illustrates the step of rolling the composite bar or ingot;

Figure 6 is a diagrammatic cross-sectional view of the bar or ingot after one or more passes through the rolls;

Figure 7 is a view on a larger scale similar to the section shown in Figure 6 after further reduction in thickness of the product;

Figure 8 shows a modified form of ingot and mold box formed by rolling flanges on the edges of a bar or slab;

Figure 9 shows a cast ingot and mold box;

Figure 10 shows in cross section the form of ingot and mold box of Figure 8 with the copper slab put in place in the mold box;

Figure 11 is a similar cross-sectional view showing the copper slab as slightly modified in configuration;

Figure 12 shows a modified form of steel slab and mold box with copper slabs at the top and sides of the steel slab to cover the steel on one side and two edges;

Figure 13 shows in top plan view a mold for producing a double clad ingot;

Figure 14 is a side elevational view of the same;

Figure 15 is a vertical longitudinal section taken on the line 15—15 of Figure 14;

Figure 16 is a vertical longitudinal section taken through another form of mold box and ingot with the copper slabs in place for coating the two sides of a steel ingot;

Figure 17 is a horizontal cross-section taken on the line 17—17 of Figure 16;

Figure 18 is a vertical sectional view through a mold box showing a method of cladding a steel ingot on both sides in a refractory mold;

Figure 19 is a modified form of mold box similar to that shown in Fig. 2, showing, however, the sideboards first welded or brazed to the copper slabs and thereafter secured to the steel ingot;

Figure 20 shows a similar section in which the mold box is completely closed at the top to exclude oxygen during the melting of the copper;

Figure 21 is a diagrammatic cross-sectional view of a clad sheet in which an intermediate alloy is formed at the juncture of the cuprous and ferrous metal;

Figure 22 is a similar diagrammatic cross-section showing a ferrous sheet clad on opposite sides with cuprous metal and an intermediate alloy bonding the two together at the junctures.

Figure 23 is a diagrammatic illustration on an enlarged scale, and not in proportion, showing the method of employing an intermediate bonding metal between the cuprous metal and the ferrous metal, with intermediate alloys of different character facing respectively the cuprous metal and the ferrous metal;

Figure 24 is a diagram illustrating the bonding or welding of a sheet of nickel to the face of a steel block by pressure, at a temperature below the melting point of either metal;

Figure 25 is a diagram illustrating application of the bonding metal by pouring the same upon the welding face of the steel block; and Figure 26 is a fragmentary sectional view illustrating the application of the cuprous block to the ferrous block under pressure, and the sealing and locking of the two parts together under pressure, to facilitate welding.

Referring first to Figure 1, I have shown a slab 1 of cuprous metal to be welded on top of a block or ingot 2 of a ferrous metal. For the purpose of making a clad metal sheet the block 1 will be made of high copper alloy which may be termed copper, and the block 2 may be made of iron, or its various commercial forms, more particularly low carbon steel. For a clad sheet, obviously the copper cladding need be only a small fraction of the finished sheet, for example, 10 to 20% of the thickness of the complete block or sheet, in the final form.

Obviously, where a different product, such as a bimetallic thermostat is to be produced, the materials may be varied and the relative thickness may likewise be varied.

In joining the copper block 1 to the steel block 2, I first provide the steel block 2 with a box-like extension. In Figure 2 I have shown end strips 3—4 and side strips 5—6 welded along their lower margins as indicated at 7—7 to the steel block, and have welded the corners as at 8—8 to form a liquid-tight box the bottom of which is the face 9 of the block 2. This face 9 is then carefully cleaned as by sand blasting. This sand blasting may be done before the side walls are welded in place. The copper block 1 has its welding face 10 cleaned, preferably in like manner. The surface of each of the blocks 1 and 2 may then be covered with a suitable flux, for example, anhydrous borax may be melted upon the cleaned surface, or the block 1 may be placed upon the block 2 with a suitable flux interposed. The object of the flux is to seal the steel surface from oxidation until covered by facing metal and thereby to facilitate the union of the two metals by welding.

It is desirable, at all events, to exclude oxygen or other gases from the welding faces, and to this end the block 1 is made small enough to fit readily within the mold box formed of the side plates 3, 4, 5, 6, and the space along the edges is packed with a suitable flux material or sealing material, and the upper edges may then be sealed with a relatively soft metal, such as solder, tin or the like, forming a small fillet or luting ring, as indicated at 12—12, shutting off substantially air-tight the edge of the copper block 1 from the side walls 3, 4, 5, 6. The use of the sealing ring 12 is optional. The assembly is then placed in a furnace, as indicated at 13, and is subjected to heat to raise the temperature of the mass to the welding point.

Assuming that the block 1 is silicon bronze, of the type known in the trade as "Everdur", this block 1 will melt at approximately 1866° F. However, long before the melting point of the bronze is attained, the flux material will be melted and will form a substantially tight liquid layer which, because of the weight of the block 1, will be squeezed out as much as possible between the surfaces 9 and 10. The flux is indicated at 14 between the faces 9 and 10 and similarly, the flux material 15, between the side walls of the mold box and the copper block, likewise is melted before the copper block is melted, thereby substantially closing off the welding surfaces 9 and 10 from atmosphere, or such gases as may be present in the furnace 13. When the copper block 1 becomes melted it forms a relatively thin liquid, which begins at once to displace the flux material 14—15 to float the same to the top of the mold box. Since the copper is an excellent conductor of heat it tends to transmit heat to the welding surface 9 of the steel block 2.

The temperature of the copper or bronze 1 may be raised to the temperature necessary to secure a weld with the welding face 9 of the block 2 without injury to the properties of the said copper or bronze. The temperature necessary to bring about the weld is approximately 2200° F. When this temperature has substantially been attained, a stirring implement, which is preferably shaped like a hoe, may if desired be introduced through the opening 16 into the liquid copper or bronze to stir the liquid cuprous metal to puddle the same and to displace the flux. Such hoe-like puddling tool may be employed to scrape the surface 9 to insure that the flux will be all displaced and that the copper will bond to the steel. The flux may be skimmed off before the facing metal is allowed to solidify.

The composite ingot thus produced is allowed to cool either in the furnace or it may be removed from the furnace and allowed to cool to the point of solidification of the copper or bronze. Thereupon it may be passed between rolls such as 17—17 indicated in Figure 5, to reduce the ingot in thickness and to increase the same in width. Preferably the plates or flanges 5 and 6 which form the mold box for the copper are also bonded to the copper or bronze material, and when the ingot is passed through the rolls these flanges or side walls 5 and 6 tend to preserve the thickness of the copper body 1 by preventing lateral extrusion. The compound ingot 18 is passed through the rolls to produce finally the product shown in section in Figure 7, namely, a thin sheet 19 having the copper or bronze face 1 and the steel backing 2.

It will be apparent that any composition of the cuprous material suitable for joining to the ferrous material may be employed according to the same method.

As heretofore pointed out, it is undesirable to hold the heated cuprous material and the heated ferrous material at the welding temperature any longer than is necessary to produce a bond, and hence, as soon as the temperature at which welding occurs has been attained, and the copper material has been skimmed, it is desirable to cool the mass below the welding temperature.

Where powdered nickel is employed in the flux, the nickel tends to form an intermediate alloy at the welding surfaces. As indicated in Figure 21, where a small amount of nickel is employed at the welding surfaces, the intermediate alloy, which bonds copper and iron together, provides a highly advantageous utility. The nickel, as heretofore explained, inhibits excessive grain growth, even though the metals be subjected to a high temperature for considerable time. Obviously, where the iron or steel body 2 is an alloy involving a substantial amount of nickel, additional nickel is not required. The thickness of the alloy at the weld need not be more than .002 inch. The percentage of nickel to steel section need be only about .0002%, or a negligible amount, so far as cost is concerned.

It is not necessary to introduce the nickel in the flux as it may be introduced in any other desired manner, for example, nickel may be deposited upon the surface of the steel block, either by nickel plating or by chemical precipitation, or any of the known methods of applying a thin coating of nickel. Even a thin sheet of nickel might be employed if desired. The amount of nickel at the weld is to be controlled in accordance with the analysis of the steel to be welded. With a high nickel steel the nickel proportion of the flux would be low, and if plain steel is employed, the nickel proportion would be higher.

The manner of making up the container or mold box for the cuprous block 1 may be varied. For example, in Figure 8, the steel block 22 is part of a rolled section in which the flanges 25 and 26 are integral with the body of the block 22. The end strips 3 and 4 are welded along the edges at the side and bottom to close the box. The inner surface is cleaned and fluxed as previously described, the slab of copper or cuprous material 1 is placed in the mold box thus formed, as shown in Figure 10, with the flux interposed and sealed off by the luting material 12, and is then fired to weld, as previously described, with subsequent rolling as shown in connection with Figures 5, 6 and 7.

I find that it is possible to make the block of ferrous material in the form of a casting with integral end and side walls 33, 34, 35 and 36, as shown in Figures 9 and 11. Cast steel may be joined to copper by welding and the procedure is substantially as shown in connection with Figures 1 to 7. The maximum hot rolling temperature for copper base alloy clad steel is limited to the highest temperature at which the copper alloy can be hot worked. This is around 1600° F. Low carbon cast steel can be rolled at this temperature from the cast state, hence by my process it is possible to make the steel block a casting of low carbon steel and to bond the copper base alloy directly in the recess formed in the casting. This is then rolled to the desired thickness to form a copper clad sheet, rod, or the like.

In Figure 19 I have shown a modified form of the practice described in connection with Figure 2. In this case the side and end strips such as 5 and 6 are flanged over and first welded, as indicated at 37, to the top face of the copper block 1. This may be soldering or brazing, if desired, as the joint is not required to remain tight after the flux 14—15 is melted. Thereafter, the block 1, with the extending flanges, is fitted down over the top of the block 2, which is suitably prepared to receive it, preferably with the flux material 14 interposed, as shown, and then the lower edges of the side and end strips are welded as indicated at 7—7. The soldering or brazing becomes loosened at about the same temperature as the melting of the flux material, so that gases which may be formed can escape. In lieu of low temperature fusion at the points 37—37 the upper wall of the strips such as 5—6 may be formed with vent holes having vent covers soldered or brazed thereto and easily displaced by internal pressure when the mold and block are subjected to heating in the furnace 13. When the copper block 1 is melted to the liquid state the copper may be skimmed, as previously described.

In Figure 20 I have shown a modification of the practice shown in Figure 19 by constructing the mold box as an inverted cup or box. The inverted box 38 has a bottom which becomes a closed top placed down over the copper block 1 and the upper edges of the steel block 2 and welded around the lower edge, as indicated at 7, to the steel block 2. The closed top wall may be provided with holes and vent covers soldered or brazed thereto and releasable upon the accumulation of internal pressure. In lieu of soldered or brazed vent covers, the top wall may be provided with partially sheared out portions which, when heated, serve to release internal pressure.

Where the steel backing or block 2 is to be coated along the edges with copper, a flanged strip 40 as shown in Figure 12 having the flange 42 lying against the bottom surface of the steel block 2 may be employed, the edge of the flange 42 being welded as indicated at 7 to the adjacent face of the iron block. These walls 40 may be spaced from the side and from the ends of the steel block 2 and copper sheets or plates 43—43, which are suitably cleaned and fluxed, are laid against the side or edge faces 44—44 of the steel block 2. The facing copper block 1 is laid upon the top of the steel block with the welding faces 9, 10 adjacent each other and provided with suitable flux material 14. The edges are suitably sealed, as indicated at 12—12 by a sealing or luting material and flux material is introduced at the side as indicated at 15. The air is thereby excluded. Upon heating of the composite mold box and block as shown in Figure 12, the copper in the side blocks and end blocks 43—43 is welded to the lateral or edge faces of the steel block 2 and the facing block 1 likewise is welded to the top face 10 of the steel block 2. Puddling is preferably performed on the top surface 10, as heretofore described, to work out the flux and to insure a homogeneous copper casting. By thus shrouding the edges of the steel block 2 with copper, the tendency to oxidize and scale is thereby reduced and the rolling is simplified.

A further simplification of the rolling may be secured by making a double compound ingot, that is to say, by forming two ingots back to back so that the steel blocks are in contact and the copper faces are exposed.

In Figures 13 to 15, inclusive, I have shown one method of making a double compound ingot, two like steel blocks 45 and 46 being provided with a thin facing of copper through the method shown in Figures 1 to 4, or any equivalent method, to provide a thin facing of copper as indicated at 47, 48. Thereupon the two blocks 45, 46 are coated with a separating compound which, for example, may comprise largely graphite, then the edges of the two blocks 45, 46 are joined by a circumferential weld 41 to hold the two blocks in register. The compound block is then mounted in a mold box 49 and it may be seated on supporting blocks or pins 50 to provide space on all sides. Copper is then poured into this space and becomes welded to the copper faces 47 and 48 and also forms a complete envelope on the lateral sides and ends of the compound ingot.

In order to avoid floating of the compound ingot by the molten copper a clamp such as that shown in Figure 18 may be placed on top of the mold box 49 to hold the compound ingot in place. Also, if desired, screws may be extended through the end walls 52 and 53 of the mold box to engage the steel blocks 45 and 46, both to center the same in the mold box and also to avoid tilting or displacement of the compound ingot in the mold box. The compound ingot, after the copper sheath is welded upon all of the outer surfaces thereof, may be rolled as indicated in Figure 5 and brought to double normal thickness, whereupon the edges are cut or slitted off and the two sheets parted. The copper on the edges and ends of the compound ingot preserves the steel from contact with the air and avoids, to a large degree, the difficulties of oxidation and scaling. Obviously, since the edges are not finished surfaces, the compound block may be held by pins or screws projected through the side walls, such as 52 and 53.

The cladding of the steel with copper or cuprous metal may be done on both sides to produce a finished article as shown in Figure 22. To produce the ingot with copper facings bonded on opposite sides a mold box similar to that heretofore described, that is, formed mechanically integral with the steel block, may be employed.

In Figures 16 and 17 I have shown the steel block 55 as provided with channel shaped sheet metal pieces 56 and 57 welded at the bottom and along the side edges to the steel block 55 to form two vertical pockets. These pockets may be built up of sheet stock welded along the edges. The faces 58 and 59 are first cleaned and fluxed and the cooperating faces 60 and 62 of the copper slabs 63 and 64 respectively are similarly cleaned and fluxed and placed in the pockets formed by the metal pieces 56 and 57. The upper edges may be sealed, as heretofore described, to prevent or limit the access of atmospheric oxygen and the like to the welding surfaces of the steel block and of the copper block. The entire mold box and slab are then placed in the furnace and brought to a welding temperature as described in connection with Figure 4, the copper in the pockets 56 and 57 may be puddled to insure that the weld is properly made, and to dislodge the flux material which floats to the surface of the copper.

In this particular practice of the invention a coating of nickel to form the junction 20—20 indicated in Figure 22 is desirable, and to this end the nickel may be introduced either through the flux material at the meeting surfaces, or a thin coating of nickel may be placed on either the steel or the copper, in advance of the welding operation.

It is also possible, in accordance with my invention, to bring the steel block 55 to the proper welding temperature in a reducing atmosphere and to pour the copper directly into the pockets 56 and 57 to form the weld upon the surfaces 58 and 59. It is to be understood that this is also true of the various forms of mold boxes which I have above shown and illustrated, namely, that if the surfaces are properly cleaned and fluxed in advance, or treated with nickel or like alloy material at the surface, the steel block may be brought to a welding temperature and the cuprous metal separately brought to the welding temperature, and in a reducing atmosphere in each case. The steel being maintained in the reducing atmosphere, the copper may be poured into the integral mold box and the weld formed at the welding surface. Obviously, the copper may be melted in any desired atmosphere, but it should be carefully cleaned before pouring into the mold box. The surface of the steel should be prevented from contacting with oxygen of the air, or other gases which would tend to prevent a suitable weld or union at the welding surfaces.

By the employment of a suitable reducing atmosphere, the cuprous metal may be poured in molten condition directly in contact with the steel. Thus, for example, in Figure 18 the steel block 65, properly cleaned at the surfaces 66 and 67, is mounted in the mold cavity in the refractory lining 68 of the flask or casing 69. The steel block is held in place by pins or screws as indicated at 70—70 extending through a yoke 72 attached to the flask. The cavities at the sides may then be filled with molten copper 73—74 to form welds at the surfaces 66 and 67. The heating of the steel block and the pouring of the copper into contact therewith should, in this case, be carried on in a reducing atmosphere.

Where powdered nickel is employed to produce the bond between the cuprous metal and the ferrous metal, a bonding alloy is formed, as shown in Figures 21 and 22. In this case the nickel is assumed to be introduced in the powder form and subjected to the action of the copper and the steel in forming an alloy of nickel, copper and iron at the junction. Where the nickel or like bonding alloy is introduced as a distinct continuous body, the high melting temperature of the nickel requires that it be bonded to the steel in advance of bonding to the cuprous metal. In the example shown in Figure 24, a sheet of nickel 82 is placed upon the surface of a steel backing block 83. The edges of the nickel sheet and of the steel backing may be sealed off as by peripheral welding. The parts are then brought to a temperature short of melting either the nickel or the steel, preferably in the neighborhood of 2200° F., the welding temperature of the steel, and then the nickel sheet is pressed as by a pressure pad 84 operated by screw jack 85 to form a weld between the surfaces of sheet 82 and the block 83. Obviously, instead of a uniformly applied pressure, as shown, hammering or rolling may be employed instead. At the junction of the nickel sheet 82 and the steel block 83, a nickel iron alloy is formed. This forms a tough bond, adequately ductile and malleable to be readily worked with the remainder of the metal body.

If the sheet 82 be made of Monel metal the junction forms an alloy of nickel, copper and iron. If the thickness of the sheet 82 is in excess of that desired for forming the bond with copper, the block 83 and its facing 82 may be rolled to reduce the absolute thickness of the nickel layer 82. The iron is, at the same time, reduced in thickness. The block 83 may then be provided with the mold flanges, such as shown in Figure 2, and the pouring of the copper on top of the bond metal 82, or the melting of a block of copper in the mold box on top of the layer 82, as shown in connection with Figures 3 and 4, may be practiced.

If desired, the bonding metal, such as nickel or Monel metal, may be poured in the bottom of the mold box to form the layer 82 bonded to the steel block 83 by an intermediate alloy at the junction or union. The steel block is provided with the mold flanges, such as 5, 6, and the welding surface is cleaned and fluxed. The block is brought to a suitable temperature for bonding to the molten nickel, which molten nickel, at a temperature slightly higher than its melting point, is then poured into the mold box, and forms a bond with the welding face of the steel block 83. This should be done in a reducing atmosphere. The block, with its bonding metal 82, is allowed to solidify. It is generally desirable to allow it to cool to the point where cleaning and fluxing of the nickel face is possible. Thereupon the copper block may be laid in place, as shown in Figure 3, and the block again heated in accordance with the process described in connection with Figure 4. Alternatively, after the nickel has solidified, molten copper may be introduced on top of the layer 82, shown in Figure 25. It is not feasible to melt a solid body of nickel between the copper and the iron because of the high temperature required to melt the nickel, such temperature being injurious to the cuprous metal, and being at or above the melting point of the steel.

The final product of interposing a thin cohesive layer of nickel or like bonding metal between the cuprous metal and the ferrous metal is shown in Figure 23, in diagram. In the final product no clear line of demarcation of the various layers may be discernible but the principle is illustrated in Figure 23.

The cuprous metal in Figure 23 may be any suitable alloy of copper, or copper itself. The bonding metal is any metal such as nickel or Monel metal, which is soluble in fairly wide proportions in the cuprous metal and in the ferrous metal. The intermediate alloy between the bonding metal and the cuprous metal is an alloy of the cuprous metal and the bonding metal and, as above pointed out, any of the metals alloyed with the cuprous metal, such as aluminum, lead, manganese, silicon, tin and zinc will enter into this intermediate alloy. On the other side of the bonding metal there is an alloy of the ferrous metal and the bonding metal, and this alloy may contain other ingredients, such as chromium, cobalt, manganese, magnesium, molybdenum, phosphorus, silicon and carbon, which are capable of entering into solution with the iron.

The details of the practice of the process as shown above may be varied within the skill of those working in this art.

Other methods of applying nickel or its alloys to the surface of either the copper or the iron may be employed, such, for example, as by spraying molten metal by what is designated as the "Schoop" process, or by the electric arc, as above disclosed.

In Figure 26 I have shown a method of locking and sealing the cuprous block 1 to the ferrous block 2 under pressure, to facilitate welding of the adjacent surfaces. This method may be practiced with or without the interposition of a bonding metal between the two.

The sideboards or plates 3, 4, 5 and 6 are welded to the upper margin or edge of the block 1, as indicated at 87. The lower face 10 of the block 1, suitably cleaned, and, optionally, coated with a flux, is applied to the welding face 9 of the block 2, which is also cleaned and, optionally, fluxed. Then, by means of the press 85, 84, the copper block is forced into intimate contact with the block 2, with or without the interposition of a fluxing material, and with or without the interposititon of a bonding metal, to bring these faces together under very high pressure. Welds are then formed peripherally about the lower edge of the plates 3, 4, 5 and 6 to lock and seal the parts together under heavy pressure. The pressure of the jack 84, 85 is then released and the compound ingot, with the integral mold formed by the sideboards or plates 3, 4, 5 and 6, is then put in the furnace, as indicated in Figure 4, and the copper block 1 is welded to the block 2 by melting the copper block 1. This may be done in a reducing atmosphere, if desired. The copper may be skimmed, as previously described. The exclusion of atmosphere by the seal 87, 88 facilitates welding. Welding in this manner may, under certain circumstances, be performed without a fluxing material. Where the face of the block 2 has been provided with a bonding metal, as described in connection with Figures 24 and 25, the copper block 1 is bonded to such bonding metal by alloying with the surface thereof.

Instead of making the weld 87 at the upper peripheral edge of the copper block 1, it may be made at the lower edge of the block and the sideboards. Optionally, by step welding or the like, the side strips 3, 4, 5 and 6 may be welded directly to the sides of the copper block 1. Obvious variations of the above procedure will occur to those skilled in the art.

Monel metal, which is a natural alloy of 68% to 70% nickel, 1½% iron and the remainder copper, and has a melting point of approximately 2480° F., may be employed instead where nickel is above mentioned. It may be alloyed with ingredients which will reduce the melting point, if desired.

The employment of silicon as an alloying medium for the copper facing is of the greatest importance. It performs several different useful functions at various stages of the process and in the finished article. Primarily, it gives the copper the necessary physical property so that the copper and steel will roll together with approximately the same strength and work-hardening properties. For best results, obviously the facing and backing should have exactly the same physical properties during rolling, and silicon appears to be peculiarly suited for this purpose. The silicon further increases the final strength of the product and the corrosion resisting characteristics of the cuprous facing.

Another important function which the silicon in the cuprous alloy performs is that of rendering the copper far less subject to oxidation and gas absorption in the molten state. If substantially pure copper is poured in atmosphere into an open-face mold, the surface oxidizes badly and is subject to excessive gas absorption, with the result that the surface of the cast copper is not only oxidized but rough and pitted, making it unsuitable for immediate rolling without treatment of the surface. Trimming off the oxide and surface roughness is difficult and expensive and results in loss of the heat of the compound slab following the weld. With a small amount of silicon in the copper, excessive gas absorption and oxidation is prevented and the slab may be rolled with little, if any, preparation of the surface of the facing metal.

The silicon in the copper performs another very important function at a different stage, and that is the reduction of thermal conductivity. It is very difficult to weld pure copper because of high heat conductivity. By the employment of silicon in the cuprous metal or facing alloy the heat conductivity is very greatly reduced, with the result that arc welding and like operations can be performed upon the clad metal with facility.

I do not intend to be limited to the details shown and described, except as they are recited as an essential feature of the invention as defined in the appended claims.

I claim:

1. A rolled clad sheet metal suitable for corrosion resisting service, comprising a facing of cuprous metal comprising chiefly copper and .1% to 4.5% silicon bonded upon a base of low carbon steel, the base being at least twice as thick as the facing.

2. A composite body of metal suitable for the production of a composite sheet comprising a base of low carbon steel and a facing of a cuprous alloy welded thereto, said cuprous alloy having a thermal coefficient of expansion approximately equal to that of said steel, having a structural strength approximately equal to that of steel and permitting heating without injury to a point sufficiently close to the melting point of said steel to insure a good bond by welding, the thickness of the cuprous alloy being approximately $\frac{1}{10}$ to $\frac{1}{3}$ that of the steel base.

3. The method of welding a cuprous alloy to a ferrous base, which comprises forming an ingot of ferrous metal, forming an integral rim about the margins of the ingot by welding thin strip stock around the margin of the ingot to define a liquid retaining receptacle, forming a cuprous alloy bar, disposing said bar in said receptacle then heating the two metals together to a temperature above the melting point of the bar to weld the molten metal of the bar to the face of the ingot.

4. The method of constructing a composite ingot of cuprous metal which comprises forming a ferrous ingot of the desired dimensions, erecting a flange of ferrous metal about the margins of the ingot by welding a strip or strips to the margins thereof to form a fluid retaining receptacle, a bottom wall of which is the face of the ferrous ingot to which face the cuprous metal is to be joined, forming an ingot of cuprous metal of a size to fit in said receptacle and of the desired thickness, depositing said cuprous ingot in said receptacle, heating said two metals to a temperature above the melting point of the cuprous ingot to bring their adjacent faces to welding temperature to weld the molten metal of the cuprous ingot to the top of the ferrous ingot.

5. The method of making a composite ingot having a cuprous metal face welded to a ferrous metal base which comprises forming a ferrous ingot of the desired outline and thickness, welding to the margins of the ingot a strip or strips forming a continuous wall extending above the forming face of the ingot and thereby providing a liquid receptacle, cleaning the joining face of the ferrous ingot to which the cuprous metal is to be joined, and joining to said joining face by welding a body of cuprous metal held in molten form within said liquid receptacle.

6. The method of claim 5 wherein the ferrous ingot is composed of low carbon steel and the cuprous metal is composed of silicon bronze.

7. A composite ingot suitable for rolling into clad sheet stock comprising a base of low carbon steel, a face of silicon bronze having a silicon control between .1% to 4.5% welded thereto and a peripheral housing of steel integrally joined to said base and extending about the entire periphery of the bronze face.

8. The method of cladding ferrous metal with cuprous metal containing .1% to 4.5% silicon, which comprises welding by fusion a common bonding metal comprising nickel to the cuprous metal and the ferrous metal at their junction.

9. The method of joining a cuprous metal containing .1% to 4.5% silicon to a ferrous metal, which comprises alloying by fusion a common bonding metal with the cuprous metal and with the ferrous metal to produce a ductile bond, said bonding metal having higher solubility in each of the two metals to be joined than they have with each other.

10. As an article of manufacture, a steel base or backing, a cuprous facing containing .1% to 4.5% silicon, and a nickel bearing bonding metal alloyed with the steel backing and with the cuprous facing, respectively to produce a tough ductile bond between the base and the facing.

11. As an article of manufacture, a steel base or backing, a cuprous facing containing .1% to 4.5% silicon, an interposed layer of nickel constituting a bonding metal between said backing and facing, said bonding metal being bonded to said steel base by a nickel-iron alloy and being bonded to said facing by a nickel-copper alloy.

12. The method of cladding a ferrous metal with a cuprous metal containing .1% to 4.5% silicon, which comprises joining the ferrous and cuprous metals by alloying the junction with a bonding metal of a melting point between that of the two joined metals and capable of going into stable solution within wider proportions with each of them than they can with each other, and providing a tough, ductile junction.

13. Method of welding a cuprous face to a ferrous base which comprises erecting a marginal ferrous flange upon the ferrous base to form a basin fluid tight, preheating said base by welding a strip or strips of ferrous metal to the margins of the base and pouring molten cuprous metal into said basin.

14. Method of welding a cuprous face to a ferrous base which comprises erecting a marginal flange of ferrous metal upon the ferrous base by welding a strip or strips of ferrous metal to the margins of the base to provide a basin fluid tight, cleaning and fluxing the bottom of the basin, preheating the said base, and pouring molten cuprous metal into said basin.

15. As an article of manufacture, a composite slab capable of conversion by rolling according to steel mill practice into plates or sheets comprising a relatively thick base of steel and a relatively thin facing of an alloy of copper containing a small percentage of silicon bonded to the base by a fusion weld, the facing alloy having physical characteristics approximately the same as those of the steel in respect to workability and work-hardening properties.

16. The composite slab of claim 15, further characterized by the presence of nickel at the bond whereby a tough, tenacious bond of the facing and backing is secured, said bond permitting rolling of the slab either hot or cold without parting of the base and the facing.

17. As an article of manufacture, a composite slab comprising a relatively thick backing of steel and a relatively thin facing of a cuprous alloy comprising copper and silicon not to exceed 3%, said backing and said facing being united by a fusion weld to produce a bond, the bond containing sufficient nickel to render the same sufficiently ductile hot or cold to permit reduction in thickness by rolling according to steel mill practice without separation of the bond, the copper alloy being of approximately the same strength and work-hardening properties as the steel of the backing, whereby excessive curling of the composite article during rolling is avoided.

18. The composite slab of claim 17, characterized by the bonding of the alloy facing in the molten form onto the backing, and the silicon content of the alloy being sufficient to limit the oxidation of the surface of the copper alloy whereby the slab may be rolled without further operations upon the surface of the alloy.

19. The method of producing sheets of steel clad with a corrosion resistant facing of copper silicon alloy having a silicon content between .1% to 4.5%, which comprises bringing into welding contact, in an open-faced mould, a slab of steel heated to a temperature at least as high as the melting point of the copper-silicon alloy, and a thin facing of molten copper-silicon alloy with sufficient nickel at the meeting faces of said steel and copper silicon alloy to produce a tough ductile diffusion bond, allowing the molten copper-silicon facing to solidify, and without further treatment of the surface of the facing reducing the section of the composite body by rolling.

20. In a method of forming a composite sheet of steel clad with copper-silicon alloy having a silicon content between .1% to 4.5%, the steps which comprise heating a slab of steel, melting a charge of copper-silicon alloy and maintaining the molten charge of copper-silicon alloy with a free upper surface upon the face of the heated slab with the presence of sufficient nickel to provide a tough ductile bond at the meeting faces of the steel and the alloy, and allowing the molten charge to solidify to produce a composite body.

21. The method of claim 20 with the additional step of rolling the composite body while hot to reduce the section thereof without further treatment of the exposed surface of the alloy.

22. A composite body of metal suitable for the production of a clad sheet, comprising a base of low carbon steel and a facing of cuprous alloy bonded thereto by fusion, said cuprous alloy having a thermal coefficient of expansion approximately of the same order of that of the steel base whereby thermal curling of the resultant sheet is reduced to a workable minimum, having a structural strength and workability substantially the same as that of said steel base, having a low thermal conductivity, and being sufficiently free of gas absorption in molten condition to permit of casting in an open mould.

23. The composite body of claim 22, wherein the cuprous alloy contains silicon and nickel in useful degree and below 3% of each.

24. Method of cladding steel which comprises forming an open-faced mould by welding a strip or strips about the margin of a slab of steel to form a marginal flange, cleaning and fluxing the welding face of the slab, preheating the slab to welding temperature, pouring molten cuprous metal into the open-faced mould to produce a fusion bond with the welding face of the slab.

25. Method of cladding steel which comprises forming an open-faced mould by welding a strip or strips about the margin of a slab of steel to form a marginal flange, cleaning and fluxing the welding face of the slab, preheating the slab to welding temperature, pouring molten cuprous metal comprising copper-silicon alloy into the open-faced mould to produce a fusion bond with the welding face of the slab, allowing the cuprous metal to solidify, and while the composite slab is still hot, rolling to reduce the section and increase the area.

26. The method of claim 24 wherein the cuprous metal is a silicon bronze and characterized by the presence of sufficient nickel to form a tough ductile bond comprising copper, nickel and iron in solid solution at the weld.

27. Method of cladding by fusion welding a base of one metal with a facing of a lower melting point metal, which comprises welding peripheral flanges of a metal having a melting point substantially as high as that of said one metal about the welding face of said base to provide a liquid-tight basin forming an open-faced mould for the lower melting point metal, heating said base and mould to a temperature above the melting point of said lower melting point metal, and casting a layer of said lower melting point metal in said mould upon the welding face of said base, which layer is joined to said welding face by a fusion weld.

28. The method of claim 27 wherein casting of the said layer is secured by melting the metal of the layer in situ as the base is brought to the required temperature.

29. The method of claim 27 wherein the base metal is steel and the facing metal is a copper silicon bronze with the provision of sufficient nickel at the weld to provide a high degree of solubility of the facing metal in the base metal and vice versa, whereby a ductile bond capable of withstanding severe rolling according to steel mill practice, without weakening of the body, is provided.

30. In the method of producing copper clad sheet steel, the novel step which comprises casting upon the surface of a slab of heated steel a facing of copper containing silicon in amount of from 0.5% to 3.0%.

31. The process of claim 30, wherein the copper-silicon alloy is cast in an open-faced mould upon the surface of the steel slab which is heated to a temperature at least as high as the melting point of the copper alloy.

32. The process of claim 30, wherein nickel is present at the junction of the copper alloy and the steel in amount sufficient to produce a tough ductile diffusion bond.

33. A composite slab of metal suitable for the production of clad sheets, comprising a base of low carbon steel and facing of a cuprous alloy welded thereto by a diffusion bond which is sufficiently tough and ductile to permit the slab to be subjected to severe reduction in section and increase in area by rolling, said cuprous alloy having a thermal condustivity approximately the same as that of the steel base and being when molten sufficiently free of gas absorption to permit the cuprous facing to be cast upon the steel base in an open-faced mould, and having physical properties of elongation and work-hardening during rolling approximately the same as that of the steel backing.

34. Method of forming a composite slab suitable for the production of clad sheet metal which comprises welding to the margins of a steel slab and about the welding face a continuous flange of thin strip steel to form an open-faced mould, sand blasting the surface of the welding face, applying to said cleaned surface a bonding metal in finely subdivided form, said metal comprising nickel, covering the bonding metal with flux, preheating the slab to a temperature in excess of 2200° F., melting a suitable charge of copper-silicon alloy, introducing said charge into the mould, and allowing a fusion bond to form between the steel slab and the alloy.

35. The method of claim 34 characterized by the use of copper and nickel as the bonding metal.

36. The method of producing clad metal sheets and strips which comprises bonding the cuprous alloy to the steel base as claimed in claim 34 skimming off the slag while in molten form, allowing the cuprous alloy to solidify, and then rolling the composite slab to reduce the thickness and increase the area.

37. Method of forming a composite slab suitable for the production of clad sheet metal, which comprises welding to the margins of a steel slab and about the welding face a continuous flange of thin strip steel to form an open-faced mould, sand blasting the surface of the welding face, fluxing said cleaned surface, heating the slab to a temperature above 2200° F., pouring a charge of bonding metal comprising nickel into the mould to bond to the steel, and pouring a charge of copper-silicon alloy into the mould to bond to said bonding metal.

38. Method of bonding copper-silicon alloy to a steel slab, which comprises welding a flange of thin strip steel about the margins of the slab to produce an open-faced mould, cleaning the face of the slab to provide a welding face, covering the welding face with flux, depositing a charge of copper alloy in said mould, and heating the mould to raise the slab to a temperature above 2200° F. and at the same time melting the copper alloy in said mould and allowing the same to remain in molten condition to perfect a fusion bond with the welding face of the steel.

39. Method of joining facing and base metals each having limited solubility in the other which comprises: forming an open face mould with a surface of the base metal forming the bottom thereof, cleaning and fluxing said surface, casting into said mould a relatively thin layer of bonding metal having relatively high solubility with both said metals, and casting a relatively thick layer of said facing metal onto said layer of bonding metal, said bonding metal alloying with the adjacent facing and base metals and forming a ductile and malleable union therebetween.

40. Method of joining two metals incapable of bonding sufficiently to withstand rolling stresses when welded directly to each other which comprises: forming one of said metals into an open face mould, cleaning and fluxing the welding face of said mould, casting into said mould a thin layer of metal capable of bonding readily to both said metals and of withstanding rolling stresses, and casting a relatively thick layer of the other of said metals onto said layer of bonding metal, thereby forming a composite metal member capable of withstanding rolling stresses.

41. Method of bonding cuprous metal to a steel slab which comprises: forming an open face mould with a surface of said steel slab forming the bottom thereof, cleaning said surface, covering said surface with flux, preheating said steel slab sufficiently to fuse said flux, pouring a bonding metal on said surface to form a fusion bond therewith and allowing the same to solidify, and pouring said cuprous metal onto said bonding metal to form a fusion bond therewith.

42. Method of claim 41 characterized by the bonding metal having a melting temperature between that of the steel slab and that of the cuprous metal.

43. Method of claim 41 characterized by the bonding metal being a copper nickel alloy.

44. Method of claim 41 characterized by the bonding metal containing nickel and the cuprous metal containing at least 0.5% silicon.

45. Method of producing a composite slab which comprises: forming an open face mould by welding steel strip around the entire periphery of a steel slab, cleaning and fluxing the bottom surface of said mould, preheating said slab and mould, pouring a bonding metal on said surface to form a fusion bond therewith and allowing the same to solidify, and pouring a cuprous facing alloy onto said bonding metal to form a fusion bond therewith.

46. Method of cladding steel which comprises: forming an open-faced mould by welding a strip or strips about the margin of a slab of steel to form a marginal flange, cleaning and fluxing the welding face of the slab, preheating the slab to welding temperature, and pouring molten metal into the open-faced mould to produce a fusion bond with the welding face of the slab.

47. Method of cladding steel which comprises: forming an open-faced mould by rolling a slab into a channel-shape having a relatively thick web and welding steel strips across the ends thereby forming a marginal flange about the upper surface of the slab, cleaning and fluxing the welding face of the slab, preheating the slab to welding temperature, and pouring molten metal into the open-faced mould to produce a fusion bond with the welding face of the slab.

THOMAS B. CHACE.

CERTIFICATE OF CORRECTION.

Patent No. 2,145,248. January 31, 1939.

THOMAS B. CHACE.

It is hereby certified that error appears in the printed specification of the above numbered patent requiring correction as follows: Page 8, second column, line 31-32, claim 7, for the word "control" read content; lines 73, 74 and 75, claim 13, for "base to form a basin fluid tight, preheating said base by welding a strip or strips of ferrous metal to the margins of" read base by welding a strip or strips of ferrous metal to the margins of the base to form a fluid tight basin, preheating said base; page 9, first column, line 1, same claim, strike out "the base"; line 7, claim 14, for "basin fluid tight" read fluid tight basin; and second column, line 69, claim 29, for "body" read bond; page 10, first column, line 17, claim 33, for "condustivity" read conductivity; and that the said Letters Patent should be read with this correction therein that the same may conform to the record of the case in the Patent Office.

Signed and sealed this 28th day of March, A. D. 1939.

Henry Van Arsdale (Seal)   Acting Commissioner of Patents.